US010233854B1

(12) United States Patent
Attard et al.

(10) Patent No.: US 10,233,854 B1
(45) Date of Patent: Mar. 19, 2019

(54) ENGINE CONTROL SYSTEMS AND METHODS FOR REGULATING EMISSIONS DURING SCAVENGING

(71) Applicants: William P Attard, Brighton, MI (US); Shuonan Xu, Troy, MI (US); Tyler Tutton, Royal Oak, MI (US); Michael A Barkey, Maidstone (CA)

(72) Inventors: William P Attard, Brighton, MI (US); Shuonan Xu, Troy, MI (US); Tyler Tutton, Royal Oak, MI (US); Michael A Barkey, Maidstone (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/805,314

(22) Filed: Nov. 7, 2017

(51) Int. Cl.
| | |
|---|---|
| *F02D 41/00* | (2006.01) |
| *F02D 41/14* | (2006.01) |
| *F02D 13/02* | (2006.01) |
| *F02D 35/00* | (2006.01) |
| *F02B 25/00* | (2006.01) |
| *F01N 11/00* | (2006.01) |
| *F01N 3/10* | (2006.01) |

(52) U.S. Cl.
CPC ..... *F02D 41/1454* (2013.01); *F02D 13/0203* (2013.01); *F02D 13/0261* (2013.01); *F02D 35/0015* (2013.01); *F02D 41/1447* (2013.01); *F01N 3/101* (2013.01); *F01N 11/005* (2013.01); *F02B 25/00* (2013.01); *F02D 2200/04* (2013.01); *F02D 2200/0804* (2013.01); *F02D 2200/101* (2013.01)

(58) Field of Classification Search
CPC ............. F02D 13/0261; F02D 41/1446; F02D 41/1447; F02D 41/1454; F02D 2200/0804; F01N 11/005
USPC .................................. 701/103, 109; 123/676
See application file for complete search history.

(56) References Cited

U.S. PATENT DOCUMENTS

| | | | |
|---|---|---|---|
| 6,827,051 B2 | 12/2004 | Kawasaki et al. | |
| 7,275,516 B1 | 10/2007 | Cunningham et al. | |
| 8,001,833 B2 | 8/2011 | Delp | |
| 9,103,293 B2 | 8/2015 | Jankovic et al. | |
| 9,399,962 B2 | 7/2016 | Hagner et al. | |
| 2010/0312451 A1* | 12/2010 | Karnik | F01N 3/10 701/102 |
| 2014/0000554 A1* | 1/2014 | Tsuyuki | F02D 41/0007 123/295 |
| 2015/0114374 A1* | 4/2015 | Horst | F02D 41/1448 123/676 |
| 2015/0204249 A1* | 7/2015 | Glugla | F02B 37/168 123/90.15 |

(Continued)

Primary Examiner — Erick R Solis
(74) Attorney, Agent, or Firm — Ralph E. Smith

(57) ABSTRACT

A control system and method utilize an exhaust oxygen (O2) sensor and a controller configured to operate a turbocharged engine in a scavenging mode, and while the operating the engine in the scavenging mode: command a target in-cylinder air/fuel ratio (FA) for achieving a target exhaust gas FA, adjust the measurement of the exhaust O2 sensor based on a scavenging ratio and the target in-cylinder FA to obtain a modified O2 concentration, adjust an exhaust system temperature modeled by a thermal model to obtain a modified exhaust system temperature, and adjust the target in-cylinder FA based on the modified O2 concentration and the modified exhaust system temperature.

18 Claims, 6 Drawing Sheets

(56) References Cited

U.S. PATENT DOCUMENTS

2016/0153331 A1\* 6/2016 Cavanna ............... F01N 3/05
                                                    60/273
2017/0030237 A1\* 2/2017 Delp .................. F01N 11/002

\* cited by examiner

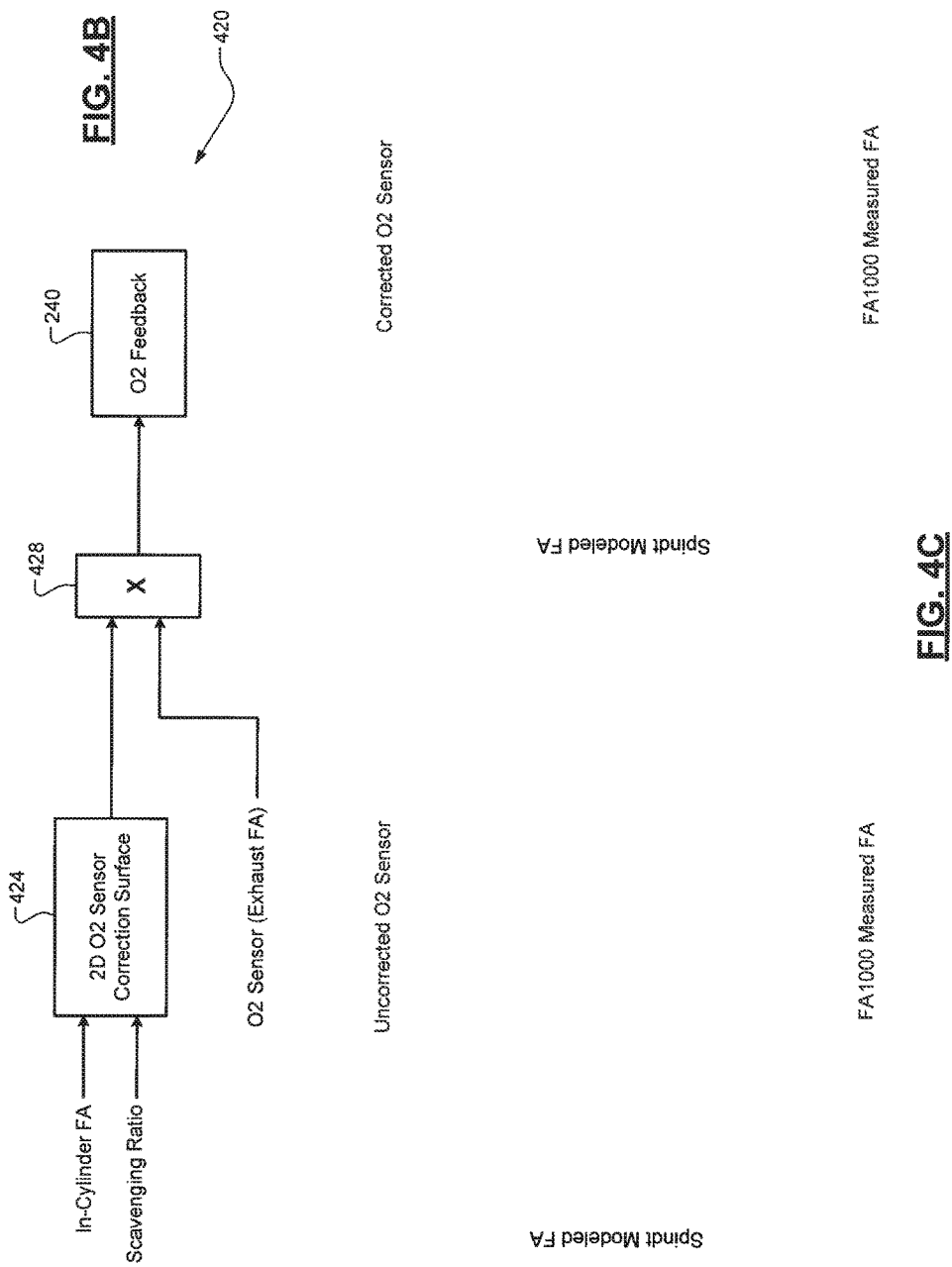

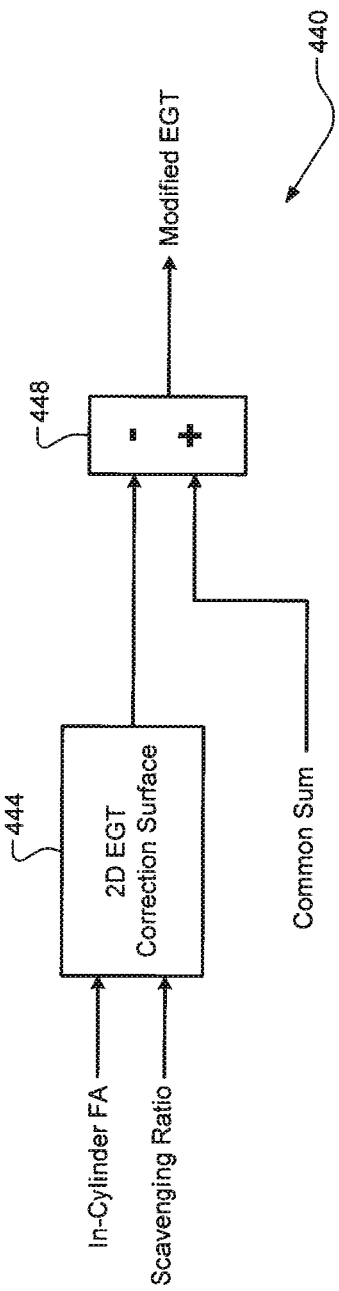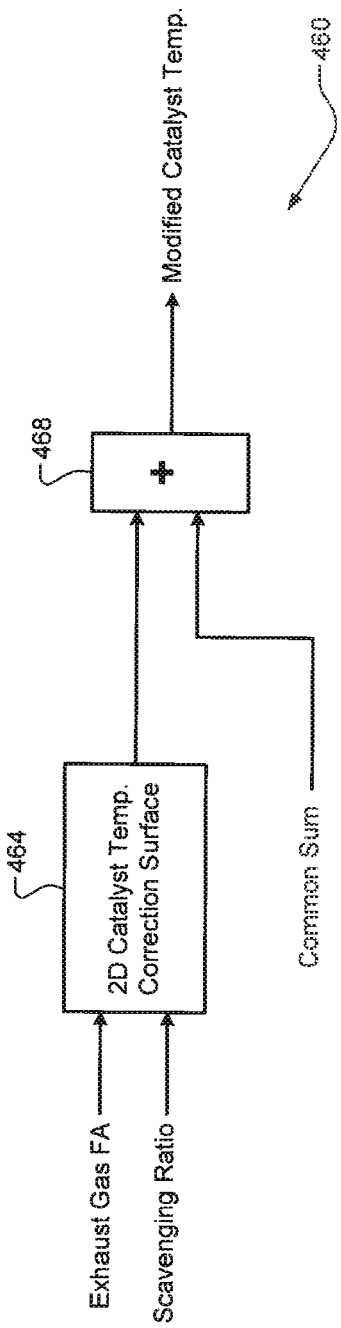

US 10,233,854 B1

ENGINE CONTROL SYSTEMS AND METHODS FOR REGULATING EMISSIONS DURING SCAVENGING

FIELD

The present application generally relates to internal combustion engines and, more particularly, to engine control systems and methods for regulating emissions during scavenging.

BACKGROUND

An internal combustion engine combusts a mixture of air and fuel within cylinders to generate drive torque at a crankshaft. Scavenging refers to an operating mode of the engine where a specific overlap of the cylinder intake and exhaust valves being open is commanded such that fresh air forces residual exhaust gas out of the cylinder. Utilizing the scavenging mode of the engine potentially increase engine performance at certain operating conditions, such as low engine speeds. When the engine is operating in the scavenging mode, however, the in-cylinder air/fuel ratio (FA) no longer equals the exhaust gas FA. This difference in the exhaust gas FA potentially causes an increase in emissions if unaccounted for. This could be particularly true for turbocharged engines due to the larger pressure differentials of air and exhaust gas. Accordingly, while such engine systems work well for their Intended purpose, there remains a need for improvement in the relevant art.

SUMMARY

According to one example aspect of the invention, a control system for a vehicle powertrain having an engine and at least one turbocharger is presented. In one exemplary implementation, the system comprises: an exhaust oxygen (O2) sensor configured to measure an O2 concentration of exhaust gas generated by and expelled from the engine into an exhaust system; and a controller configured to operate the engine in a scavenging mode, where opening of respective intake and exhaust valves of cylinders of the engine overlap, and while the operating the engine in the scavenging mode: command a target in-cylinder air/fuel ratio (FA) for achieving a target exhaust gas FA; adjust the measurement of the exhaust O2 sensor based on a scavenging ratio and the target in-cylinder FA to obtain a modified O2 concentration, the scavenging ratio indicating a ratio of (i) a total air charge flowing through a cylinder of the engine to (ii) a trapped air mass within the cylinder; adjust an exhaust system temperature modeled by a thermal model to obtain a modified exhaust system temperature, the adjustment to the modeled exhaust system temperature being based on the scavenging ratio and at least one of the target in-cylinder FA and the target exhaust gas FA; and adjust the target in-cylinder FA based on the modified O2 concentration and the modified exhaust system temperature.

In some implementations, adjusting the target in-cylinder FA comprises enriching the target in-cylinder FA, and wherein the target exhaust gas FA is stoichiometric. In some implementations, the controller is further configured to initially determine the target in-cylinder FA based on engine speed and the total air charge. In some implementations, the controller continues to perform other in-cylinder FA enrichments while the engine is operating in the scavenging mode and while adjusting the target in-cylinder FA. In some implementations, the other in-cylinder FA enrichments performed by the controller include at least one of a variable valve control (VVC) system based enrichment and an engine knock based enrichment.

In some implementations, the thermal model is an exhaust gas temperature model that models a temperature of the exhaust gas, and wherein the adjusting of the modeled exhaust gas temperature is based on the scavenging ratio and the target in-cylinder FA. In some implementations, the thermal model is a catalyst temperature model that models a temperature of a catalyst in the exhaust system, and wherein adjusting the modeled catalyst temperature is based on the scavenging ratio and the target exhaust gas FA. In some implementations, the catalyst is a three-way catalytic converter. In some implementations, the thermal model comprises a feature that corrects an exhaust system temperature model based on at least one of the target in-cylinder FA and the target exhaust gas FA, and wherein this feature of the thermal model is disabled while operating the engine in the scavenging mode.

According to another example aspect of the invention, a method of operating a vehicle powertrain having an engine and at least one turbocharger is presented. In one exemplary implementation, the method comprises: operating, by a controller of the vehicle powertrain, the engine in a scavenging mode; and while operating the engine in the scavenging mode: commanding, by the controller, a target in-cylinder air/fuel ratio (FA) for achieving a target exhaust gas FA; receiving, by the controller and from an exhaust oxygen (O2) sensor, a measurement of an O2 concentration of exhaust gas generated by and expelled from the engine into an exhaust system; adjusting, by the controller, the measurement of the exhaust O2 sensor based on a scavenging ratio and the target in-cylinder FA to obtain a modified O2 concentration, the scavenging ratio indicating a ratio of (i) a total air charge flowing into a cylinder of the engine to (ii) a trapped air mass within the cylinder; adjusting, by the controller, an exhaust system temperature modeled by a thermal model to obtain a modified exhaust system temperature, the adjustment to the modeled exhaust system temperature being based on the scavenging ratio and at least one of the target in-cylinder FA and the target exhaust gas FA; and adjusting, by the controller, the target in-cylinder FA based on the modified O2 concentration and the modified exhaust system temperature.

In some implementations, adjusting the target in-cylinder FA comprises enriching the target in-cylinder FA, and wherein the target exhaust gas FA is stoichiometric. In some implementations, the method further comprises initially determining, by the controller, the target in-cylinder FA based on engine speed and the total air charge. In some implementations, the method further comprises performing, by the controller, other in-cylinder FA enrichments while the engine is operating in the scavenging mode and while adjusting the target in-cylinder FA. In some Implementations, the other in-cylinder FA enrichments performed by the controller include at least one of a variable valve control (VVC) system based enrichment and an engine knock based enrichment.

In some implementations, the thermal model is an exhaust gas temperature model that models a temperature of the exhaust gas, and wherein the adjusting of the modeled exhaust gas temperature is based on the scavenging ratio and the target in-cylinder FA. In some implementations, the thermal model is a catalyst temperature model that models a temperature of a catalyst in the exhaust system, and wherein adjusting the modeled catalyst temperature is based on the scavenging ratio and the target exhaust gas FA. In some implementations, the catalyst is a three-way catalytic converter. In some implementations, the thermal model comprises a feature that corrects an exhaust system temperature model based on at least one of the target in-cylinder FA and the target exhaust gas FA, and wherein this feature of the thermal model is disabled while operating the engine in the scavenging mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4B depicts a functional block diagram of an example oxygen (O2) sensor correction architecture according to the principles of the present disclosure;

FIG. 4C depicts plots of example uncorrected and corrected O2 sensor measurements during scavenging according to the principles of the present disclosure; and FIGS. 4D-4E depict functional block diagrams of example exhaust gas temperature model and catalyst temperature model correction architectures, respectively, according to the principles of the present disclosure.

DETAILED DESCRIPTION

As discussed above, there remains a need for improvement to engine systems when scavenging and, more particularly, for turbocharged engine systems. In normally aspirated (NA) engines, the scavenging ratio—a ratio of an air charge flowing through the cylinder to a trapped air mass within the cylinder—is typically relatively low (e.g., ~1.01, or 1% of the air charge flowing through the cylinder). In turbocharged engine systems, on the other hand, the achievable scavenging ratio is typically much greater (e.g., as high as ~1.25 or 25% of the air charge flowing through the cylinder). The larger scavenging ratios for turbocharged engine systems can cause decreased engine performance if not accurately accounted for in controlling the supply of air and fuel to the engine.

Accordingly, turbocharged engine control systems and methods for regulating emissions during scavenging are presented. These techniques can be divided into three interconnected features: (i) closed-loop in-cylinder air/fuel ratio (FA) control (enrichment) to achieve a target exhaust gas air/fuel ratio (FA), e.g., stoichiometric, (ii) exhaust gas oxygen (O2) sensor correction, and (iii) exhaust system temperature model correction. Scavenging in general affects O2 sensor readings because both air and fuel are present in the exhaust gas, which causes the O2 sensor readings to be corrupted. When only air or fuel is present in the exhaust gas, on the other hand, the O2 sensor behaves well. Because the O2 sensor readings are typically used for fuel control, these readings need to be adjusted when scavenging. Enrichment while scavenging also affects exhaust gas temperature due to dilution, unburnt fuel oxidation, exothermic reactions, and the like. Exhaust system temperature is also typically used for fuel control and thus modeled exhaust system temperature needs to be adjusted when scavenging.

Figure 1:
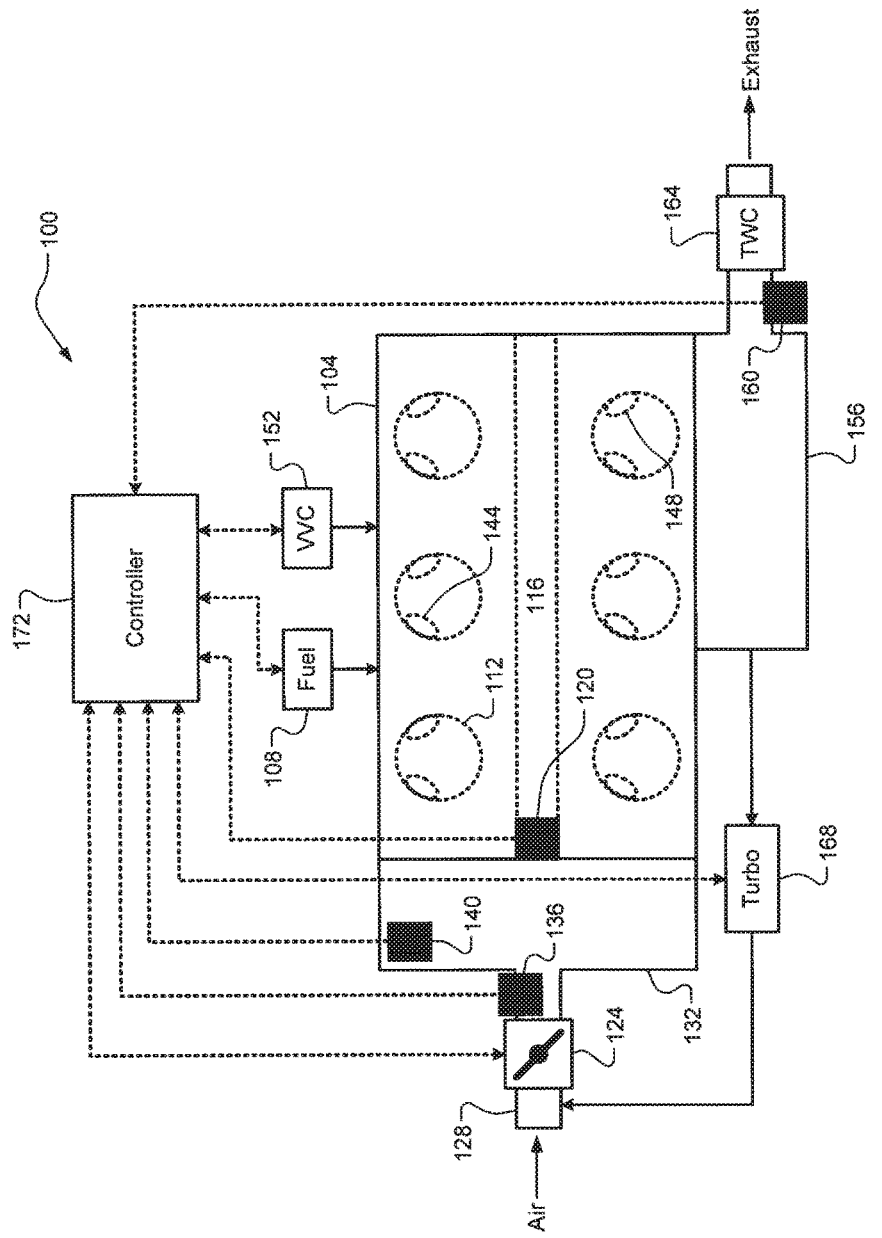
FIG. 1 depicts a diagram of an example vehicle powertrain according to the principles of the present disclosure.

Referring now to FIG. 1, an example vehicle powertrain 100 is illustrated. The vehicle powertrain 100 includes an engine 104 that combusts a mixture of air and fuel (e.g., gasoline) from fuel injectors 108 within cylinders 112 (e.g., using spark plugs, not shown) to drive pistons (not shown) that generate drive torque at a crankshaft 116. An engine speed sensor 120 is configured to measure a rotational speed of the crankshaft 116. A throttle valve 124 controls the flow of air through an induction system 128 and into an intake manifold 132. An air charge flowing into each cylinder 112 is modeled or determined based on measurements from one or more airflow sensors. Non-limiting examples of these airflow sensors are a mass airflow (MAF) sensor 136 that measures a rate of airflow through the induction system 128 and an intake manifold absolute pressure (MAP) sensor 140 that measures a pressure of air in the intake manifold 132.

Intake and exhaust valves 144, 148 control the flow of air and exhaust in and out of each respective cylinder 112. The specific opening/closing of the Intake and exhaust valves 144, 148 is controlled by a variable valve control (VVC) system 152 that controls lift and/or timing of the intake and exhaust valves 144, 148. In one exemplary implementation, the VVC system 152 could switch a different profile camshaft (not shown) to operate the engine 104 in the scavenging mode. Alternatively, the intake and exhaust valves 144, 148 could be electronically controlled by the VVC system 152 to dynamically control the opening of the overlap of the intake and exhaust valves 144, 148 and thereby control the scavenging ratio of the engine 104. The exhaust gas is expelled from the cylinders 112 into an exhaust system 156 that treats the exhaust gas to reduce emissions prior to its release into the atmosphere.

An exhaust O2 sensor 160 measures an amount of oxygen in the exhaust gas. While a single exhaust O2 sensor 160 is illustrated, it will be appreciated that a plurality of exhaust O2 sensors could be implemented (e.g., upstream and downstream from a catalyst 164). In one exemplary implementation, the catalyst 164 is a three-way catalytic converter or TWC. A turbocharger system 168 comprising at least one turbocharger is configured to utilize the kinetic energy of the exhaust gas or "boost" to force more air into the engine 104 via the induction system 128. A controller 172 controls operation of the vehicle powertrain 100, including airflow (via the throttle valve 124), fuel (via the fuel injectors 108), and the turbocharger system 168 (e.g., boost via a wastegate valve, not shown). The controller 172 also performs at least a portion of the techniques of the present disclosure, which are discussed more fully below.

Figure 2:
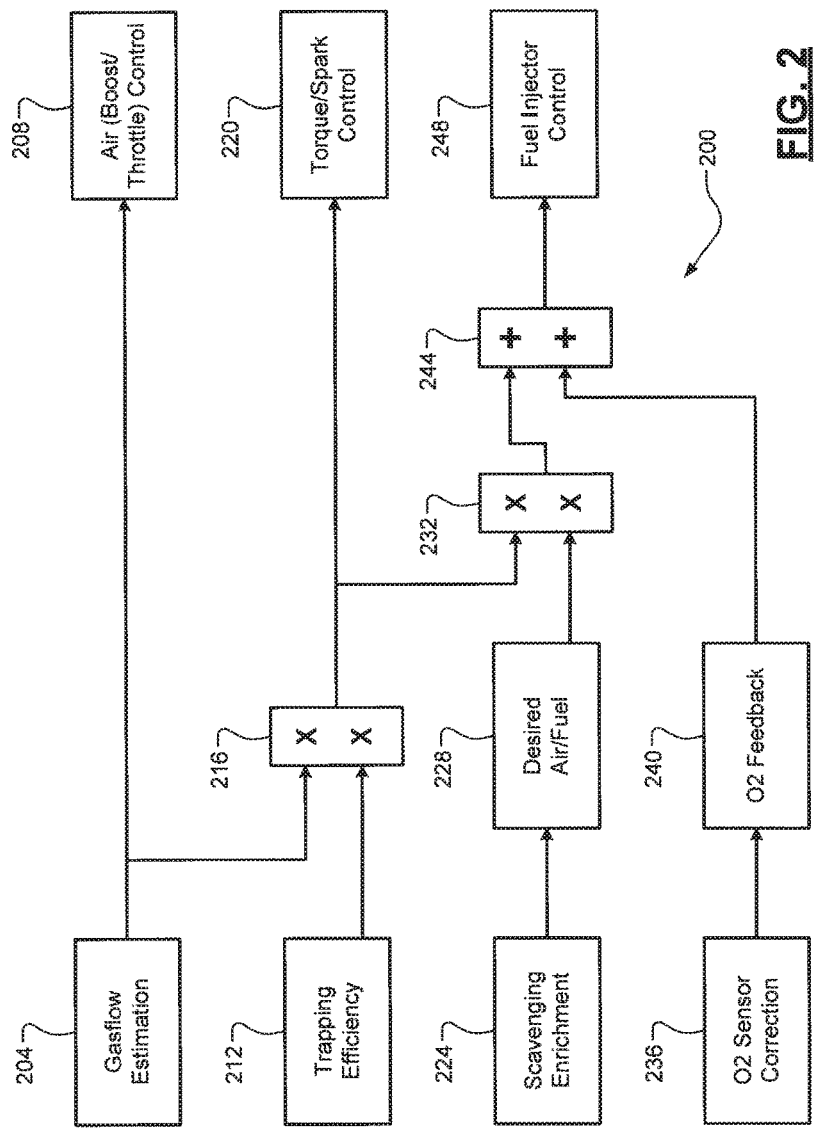
FIG. 2 depicts a functional block diagram of an example gasflow and fueling architecture according to the principles of the present disclosure.

Referring now to FIG. 2, a functional block diagram of an example gasflow and fueling architecture 200 is illustrated. This architecture 200 could be implemented, for example, within the controller 172. A gasflow estimation block 204 estimates a total airflow into each cylinder 112. It will be appreciated, however, that this airflow could also be described as gasflow because the air charge could have other non-air components, such as exhaust gas via an exhaust gas recirculation (EGR) system (not shown in FIG. 1). This estimation can be made based on a variety of parameters, such as, for example only, airflow measured by the MAF sensor 136 and air pressure measured by the MAP sensor 140. The estimated total airflow is provided to an air control block 208. For example, the air control block 208 could use the estimated total airflow to control the throttle valve 124 and/or boost of the turbocharger system 168 (e.g., via a wastegate valve). A trapping efficiency block 212 estimates a trapping efficiency of the engine 104. The trapping efficiency represents the inverse of the scavenging ratio (1/SR, where SR=scavenging ratio).

The estimated trapping efficiency is multiplied by the estimate total airflow at multiplier 216, which outputs an estimated trapped airflow. This represents an estimated air charge trapped in each cylinder 112 for a combustion event. The estimated trapped airflow is provided to a torque/spark control block 220. The torque/spark control block 220 can control timing of spark plugs (not shown in FIG. 1), such as retarding spark timing. A scavenging enrichment block 224 and a desired air/fuel block 228 determine an enriched target in-cylinder FA ratio to achieve a desired exhaust gas FA (e.g., stoichiometric) as discussed in greater detail later on. The target in-cylinder FA is multiplied by the estimated trapped airflow at multiplier 232, which outputs a target amount of fuel. An O2 sensor correction block 236 and an O2 feedback block 240 determine a fuel correction value. The fuel correction value is summed with the target amount of fuel at adder 244, which outputs a final target amount of fuel to fuel injector control block 248. Fuel injector control block 248 can then control the fuel injectors 108 accordingly. As mentioned above, the functionality of the scavenging enrichment and O2 correction blocks 224 and 236 will now be described in greater detail.

Figure 3:
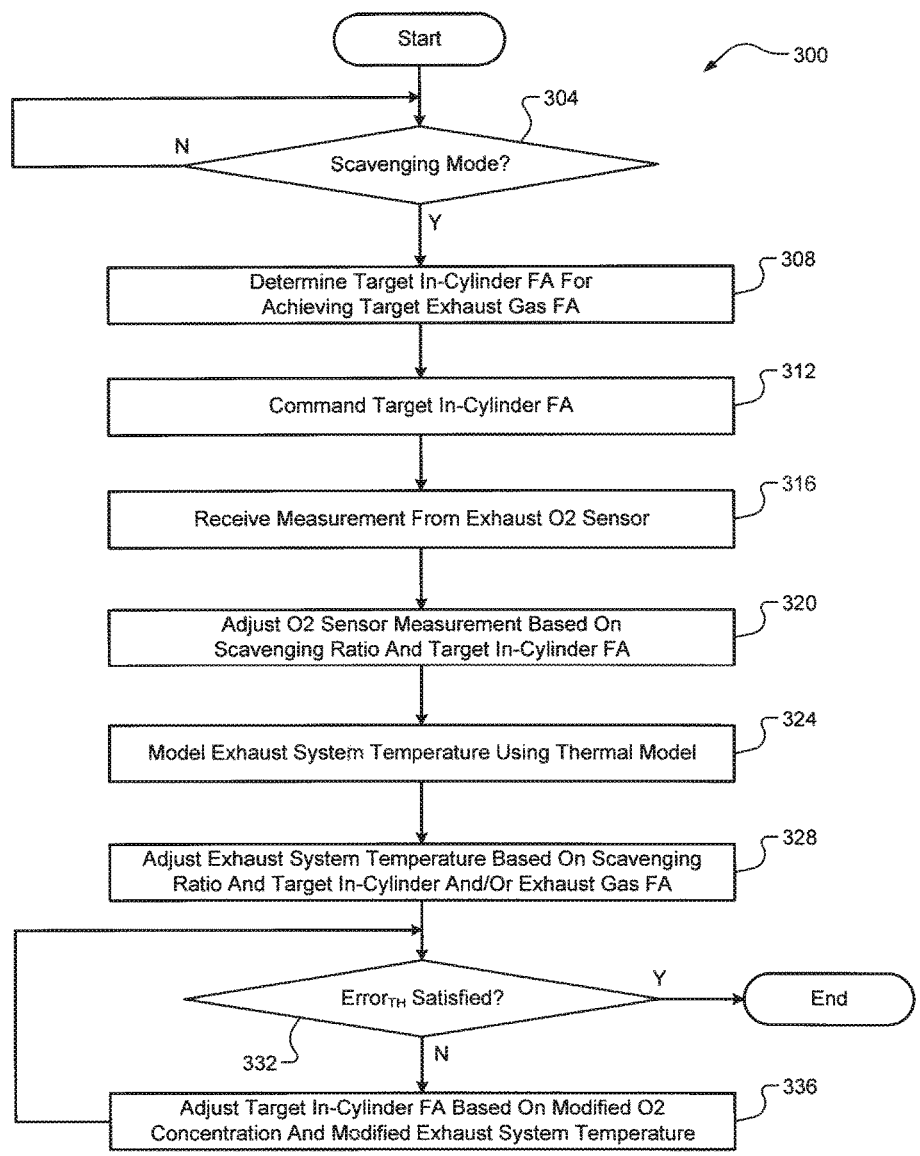
FIG. 3 depicts a flow diagram of an example method of operating a vehicle powertrain according to the principles of the present disclosure.
Figure 4A:
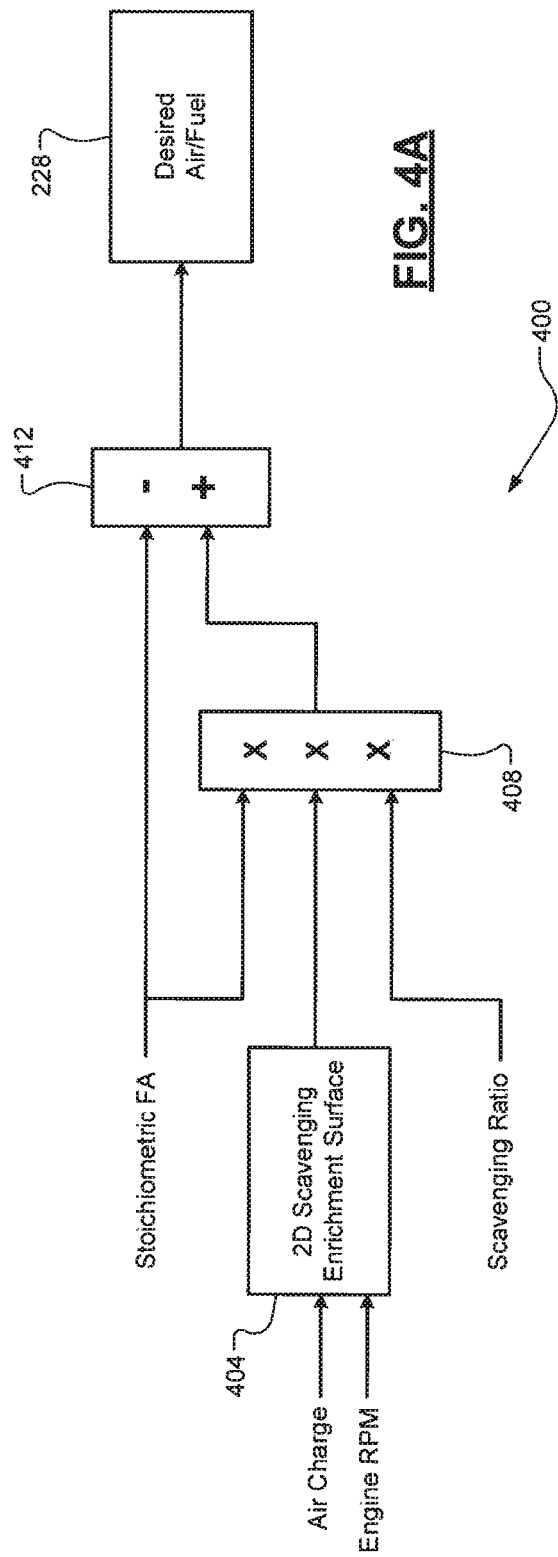
FIG. 4A depicts a functional block diagram of an example scavenging in-cylinder FA enrichment architecture according to the principles of the present disclosure.

Referring now to FIG. 3, a method 300 of operating the vehicle powertrain 100 is illustrated. At 304, the controller 172 detects whether a scavenging mode of the engine 104 has been or is being initiated. The engine 104 could be either operating in a steady-state scavenging mode or a transient scavenging mode. This determination is made based on any suitable set of vehicle powertrain operating parameters (airflow, air/exhaust pressures, engine/vehicle speeds, engine torque request, etc.). If true, the method 300 proceeds to 308. Otherwise, the method 300 ends or returns to 304. At 308, the controller 172 determines a target value for an in-cylinder FA to achieve a target value for an exhaust gas FA. The in-cylinder FA will be enriched (compared to stoichiometric) and the exhaust gas FA could be, for example, stoichiometric (e.g., to achieve emissions compliance). An architecture 400 for scavenging enrichment of the in-cylinder FA is depicted in FIG. 4A. In one exemplary implementation, a scavenging enrichment term output by a calibrated two-dimensional surface 404 (based on total air charge, such as a target throttle inlet pressure or TIP and engine speed or RPM) is utilized by a multiplier 408 with the scavenging ratio and a stoichiometric FA, and this output is utilized by an adder 412 to the stoichiometric FA to obtain the open-loop, target value for the in-cylinder FA.

At 312, the controller 172 commands the in-cylinder FA to the target value, e.g., by controlling the fuel injectors 108. At 316, the controller 172 receives a measured O2 concentration from the exhaust O2 sensor 160. At 320, the controller 172 adjusts the measured O2 concentration based on the scavenging ratio and the in-cylinder FA. For example, the error (and thus magnitude of the adjustment) could be much greater for a larger scavenging ratio (e.g., 1.10 or greater) and a lesser/leaner in-cylinder equivalent FA (e.g., 0.90 or less). An architecture 420 for adjusting the measured O2 concentration is depicted in FIG. 4B. In one exemplary implementation, an O2 correction term output by a calibrated two-dimensional surface 404 (based on the target in-cylinder FA and the scavenging ratio) is utilized by a multiplier 408 with the measured O2 concentration (indicative of the exhaust gas FA) to obtain the modified O2 concentration (or modified exhaust gas FA). FIG. 4C depicts two plots 450 and 454 of sample data illustrating the improved accuracy of the modified O2 concentration or exhaust gas FA (FIG. 4B, right) compared to the measured O2 concentration or exhaust gas FA (FIG. 4B, left) while scavenging based on Spindt FA measurement and FA1000 FA measuring. FA1000 measurement is a representation of a wide range O2 sensor, whereas Spindt is a dynamometer instrumented emissions analyzer.

Referring again to FIG. 3, at 324 the controller 172 models one or more exhaust system temperatures using a thermal model. This thermal model could be an exhaust gas temperature model, a catalyst (e.g., TWC 164) temperature model, or a combination thereof, and the modeled exhaust system temperature(s) (e.g., modeled exhaust gas and/or catalyst temperatures) would correspond thereto. For the exhaust gas temperature model, the modeled exhaust gas temperature is adjusted by the controller 172 based on the scavenging ratio and the target in-cylinder FA. For the catalyst temperature model, the modeled catalyst temperature is adjusted by the controller 172 based on the scavenging ratio and the target exhaust gas FA. At 328, the controller 172 adjusts the modeled exhaust gas and/or catalyst temperatures. Architectures 440, 460 for adjusting the modeled exhaust gas and catalyst temperatures are depicted in FIGS. 4D and 4E, respectively. In one exemplary implementation, an exhaust gas temperature (or EGT) correction term output by a calibrated two-dimensional surface 444 (based on the target in-cylinder FA and the scavenging ratio) is utilized as by adder 448 with the modeled exhaust gas temperature to obtain the modified exhaust gas temperature. Similarly, in one exemplary implementation, a catalyst temperature correction term output by a calibrated two-dimensional surface 464 (based on the exhaust gas FA and the scavenging ratio) is utilized as by adder 468 with the modeled catalyst temperature to obtain the modified catalyst temperature.

It will be appreciated that the thermal model(s) could already include a feature that corrects or adjusts its modeled temperature to account for the in-cylinder FA and/or exhaust gas FA. This feature can be disabled or deactivated while scavenging to prevent these scavenging FA-based adjustments from double dipping and thus under or over correcting. It will also be appreciated that the FA enrichments of the present disclosure are able to operate along with other FA enrichments. That is, these other FA enrichments will not be disabled or otherwise modified while performing the scavenging FA enrichment discussed herein. Instead, the scavenging FA enrichment of the present disclosure will operate in addition to or on top of these other FA enrichments. Non-limiting examples of these other FA enrichments include VVC system-based FA enrichments, thermal enrichments, and knock-based FA enrichments (e.g., low-speed, pre-ignition, or LSPI knock FA enrichment).

Referring again to FIG. 3, at 332 the controller 172 determines whether closed-loop control of the in-cylinder FA is required. This determination could be made, for example, based on the modified O2 concentration or exhaust gas FA and the modified exhaust gas and/or catalyst temperatures. For example only, the modified catalyst temperature could be approaching a critical threshold where damage to the TWC 164 could potentially occur. To avoid this, the in-cylinder FA could be adjusted to a leaner FA. Similarly, for example only, the modified O2 concentration could be indicative of a less than stoichiometric FA and thus the in-cylinder FA could be further enriched. Essentially, these modified parameters are utilized to determine an exhaust gas FA error that is compared to a threshold ($Error_{TH}$). For example, the error threshold could be the indicated exhaust gas FA being within 1% of stoichiometric. If this error threshold is satisfied, the method 300 ends or returns to 304. If the error threshold is not satisfied, the in-cylinder FA adjustment is performed at 336 and the method 300 returns to 332.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC). one or more processors and a non-transitory memory having instructions stored thereon that, when executed by the one or more processors, cause the controller to perform a set of operations corresponding to at least a portion of the techniques of the present disclosure. The memory could also store vehicle data, such as calibration data for performing the techniques described herein. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle powertrain having an engine and at least one turbocharger, the system comprising:
    an exhaust oxygen (O2) sensor configured to measure an O2 concentration of exhaust gas generated by and expelled from the engine into an exhaust system; and
    a controller configured to operate the engine in a scavenging mode, where opening of respective intake and exhaust valves of cylinders of the engine overlap, and while the operating the engine in the scavenging mode:
        command a target in-cylinder air/fuel ratio (FA) for achieving a target exhaust gas FA;
        adjust the measurement of the exhaust O2 sensor based on a scavenging ratio and the target in-cylinder FA to obtain a modified O2 concentration, the scavenging ratio indicating a ratio of (i) a total air charge flowing through a cylinder of the engine to (ii) a trapped air mass within the cylinder;
        adjust an exhaust system temperature modeled by a thermal model to obtain a modified exhaust system temperature, the adjustment to the modeled exhaust system temperature being based on the scavenging ratio and at least one of the target in-cylinder FA and the target exhaust gas FA; and
        adjust the target in-cylinder FA based on the modified O2 concentration and the modified exhaust system temperature.

2. The system of claim 1, wherein adjusting the target in-cylinder FA comprises enriching the target in-cylinder FA, and wherein the target exhaust gas FA is stoichiometric.

3. The control system of claim 1, wherein the controller is further configured to initially determine the target in-cylinder FA based on engine speed and the total air charge.

4. The control system of claim 1, wherein the thermal model is an exhaust gas temperature model that models a temperature of the exhaust gas, and wherein the adjusting of the modeled exhaust gas temperature is based on the scavenging ratio and the target in-cylinder FA.

5. The control system of claim 1, wherein the thermal model is a catalyst temperature model that models a temperature of a catalyst in the exhaust system, and wherein adjusting the modeled catalyst temperature is based on the scavenging ratio and the target exhaust gas FA.

6. The control system of claim 4, wherein the catalyst is a three-way catalytic converter.

7. The control system of claim 1, wherein the thermal model comprises a feature that corrects an exhaust system temperature model based on at least one of the target in-cylinder FA and the target exhaust gas FA, and wherein this feature of the thermal model is disabled while operating the engine in the scavenging mode.

8. The control system of claim 1, wherein the controller continues to perform other in-cylinder FA enrichments while the engine is operating in the scavenging mode and while adjusting the target in-cylinder FA.

9. The control system of claim 8, wherein the other in-cylinder FA enrichments performed by the controller include at least one of a variable valve control (VVC) system based enrichment and an engine knock based enrichment.

10. A method of operating a vehicle powertrain having an engine and at least one turbocharger, the method comprising:
    operating, by a controller of the vehicle powertrain, the engine in a scavenging mode; and
    while operating the engine in the scavenging mode:
        commanding, by the controller, a target in-cylinder air/fuel ratio (FA) for achieving a target exhaust gas FA;
        receiving, by the controller and from an exhaust oxygen (O2) sensor, a measurement of an O2 concentration of exhaust gas generated by and expelled from the engine into an exhaust system;
        adjusting, by the controller, the measurement of the exhaust O2 sensor based on a scavenging ratio and the target in-cylinder FA to obtain a modified O2 concentration, the scavenging ratio indicating a ratio of (i) a total air charge flowing into a cylinder of the engine to (ii) a trapped air mass within the cylinder;
        adjusting, by the controller, an exhaust system temperature modeled by a thermal model to obtain a modified exhaust system temperature, the adjustment to the modeled exhaust system temperature being based on the scavenging ratio and at least one of the target in-cylinder FA and the target exhaust gas FA; and
        adjusting, by the controller, the target in-cylinder FA based on the modified O2 concentration and the modified exhaust system temperature.

11. The method of claim 10, wherein adjusting the target in-cylinder FA comprises enriching the target in-cylinder FA, and wherein the target exhaust gas FA is stoichiometric.

12. The method of claim 10, further comprising initially determining, by the controller, the target in-cylinder FA based on engine speed and the total air charge.

13. The method of claim 10, wherein the thermal model is an exhaust gas temperature model that models a temperature of the exhaust gas, and wherein the adjusting of the modeled exhaust gas temperature is based on the scavenging ratio and the target in-cylinder FA.

14. The method of claim 10, wherein the thermal model is a catalyst temperature model that models a temperature of a catalyst in the exhaust system, and wherein adjusting the modeled catalyst temperature is based on the scavenging ratio and the target exhaust gas FA.

15. The method of claim 14, wherein the catalyst is a three-way catalytic converter.

16. The method of claim 10, wherein the thermal model comprises a feature that corrects an exhaust system temperature model based on at least one of the target in-cylinder FA and the target exhaust gas FA, and wherein this feature of the thermal model is disabled while operating the engine in the scavenging mode.

17. The method of claim 10, further comprising performing, by the controller, other in-cylinder FA enrichments while the engine is operating in the scavenging mode and while adjusting the target in-cylinder FA.

18. The method of claim 17, wherein the other in-cylinder FA enrichments performed by the controller include at least one of a variable valve control (VVC) system based enrichment and an engine knock based enrichment.

* * * * *